N. E. GAGNON.
BULL HOOK.
APPLICATION FILED JUNE 24, 1920.
1,368,497.
Patented Feb. 15, 1921.
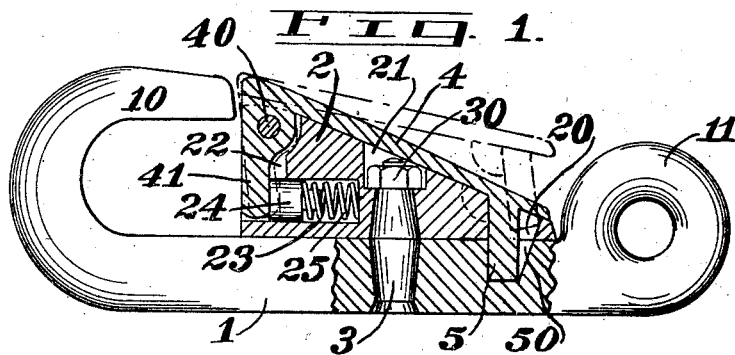
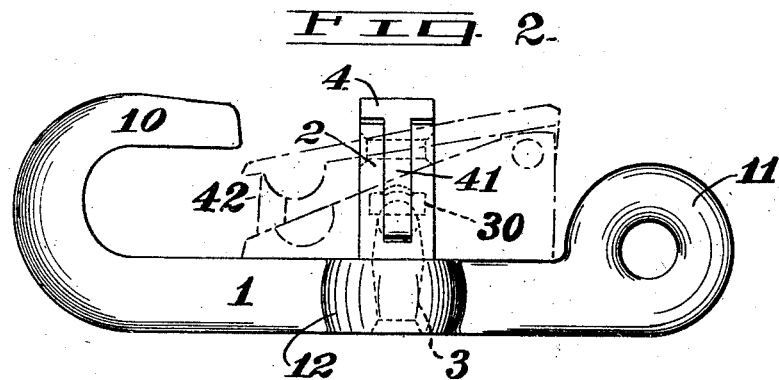
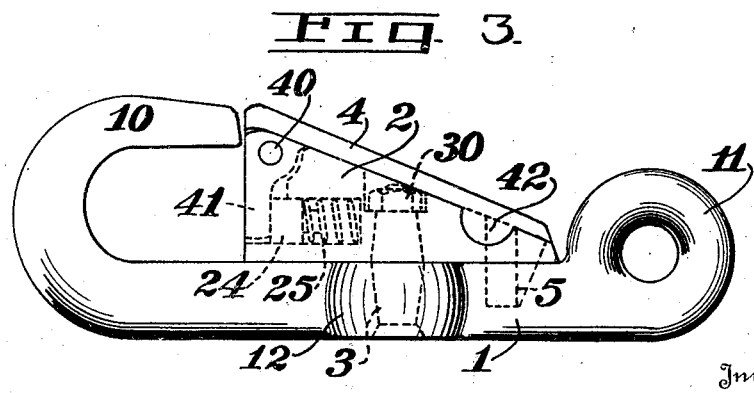
Inventor
Napoleon E. Gagnon
By N.L. & S.L. Reynolds
Attorneys

UNITED STATES PATENT OFFICE.

NAPOLÉON E. GAGNON, OF ELMA, WASHINGTON.

BULL-HOOK.

1,368,497.                 Specification of Letters Patent.      Patented Feb. 15, 1921.

Application filed June 24, 1920. Serial No. 391,427.

*To all whom it may concern:*

Be it known that I, NAPOLÉON E. GAGNON, a British subject, and resident of the city of Elma, in the county of Grays Harbor and State of Washington, have invented certain new and useful Improvements in Bull-Hooks, of which the following is a specification.

My invention relates to hooks which have associated therewith means for closing the eye of the hook so that whatever is placed within the hook cannot escape except it is intentionally released. The particular type of hook to which my invention applies is that type of hook which in logging operations is referred to as a bull hook.

The object of my invention is to provide a locking mechanism for hooks which will securely hold whatever is placed therein under rough conditions of use and which yet may be readily released when this is desired.

In the accompanying drawings I have illustrated, and in the following specification I will describe, a hook constructed in accordance with my present invention. The features of this invention which I believe to be novel and upon which I desire to obtain a patent will be particularly set forth in the claims terminating this specification.

In the drawings, Figure 1 represents a side elevation of the hook, having the locking portions thereof in section.

Fig. 2 is a side elevation of the hook showing the keeper turned at right angles to the shank, or in position which will facilitate releasing whatever has been held in the hook or placing whatever is desired within the hook.

Fig. 3 is a side elevation showing the keeper in normal or holding position.

This hook has a shank 1, which is preferably made straight, and a curved hook 10. It also has an eye 11 or any other suitable mechanism by which it may be attached to the line upon which it is to be used. The eye 11, it will be noted, has one edge thereof substantially in line with the outer edge of the shank and projects at the opposite side of the shank, the same being the side toward which the hook 10 projects. In other words, the hook 10 and the eye 11 have their lateral projection from the shank in the same direction and lie in a common plane. This feature contributes to secure one desirable result, but is not essential for certain other features of my invention.

A keeper 2 is pivoted upon the shank, between the hook and the eye, upon an axis which lies in the same plane as that of the hook and eye. This pivot is placed substantially in the middle of the length of the keeper and centrally between the tip of the hook and the inner edge of the eye, so that the keeper may turn completely around and at each end will fit closely up to the hook and eye. The shank 1, when necessary, is somewhat enlarged at the point where the pivot pin 3 passes through the same. The object of this is simply to insure that the shank shall have sufficient strength so that it will not bend at this point.

One end of the keeper 2, being the end which normally is toward the hook 10, is of such depth in the plane of the hook, that its outer edge will overlap the tip of the hook somewhat. The keeper tapers toward the eye to a thickness which will bring this end well within the outer edge of the eye 11. Pivoted at 40 upon the larger end of the keeper and at the corner which is outermost from the shank, that is, the corner which is adjacent the tip of the hook, is a latch bar 4. This latch bar 4 extends along the outer edge or surface of the keeper 2 and, at its end adjacent the eye, has secured thereto a locking pin 5, which pin is adapted to enter a hole 50 in the shank and to pass through a corresponding hole 20 in the keeper. The position and dimensions of the hole 50 and the locking pin 5, are such that the pin may be raised by swinging up or outward that end of the latch bar to which it is secured, a sufficient distance to permit its clearing the shank and thereby permit the keeper being swung upon its pivot.

The latch bar 4 has an end or finger 41 extending from its pivot toward the shank. This is preferably placed within a recess, as 22, formed in the body of the keeper. In the body of the keeper, extending from the wide end thereof toward the narrow or pointed end, and in position to aline with the inner end of the arm 41, is a bore 23 in which is placed a plunger or piston 24, which is normally projected by the action of a spring 25, which spring is in the bore 23, back of said piston. By the action of these parts the latch bar is held in locking position and yet may be raised so as to clear the locking pin 5 from the shank when this is desired.

At the swinging end of the latch bar 4 I may reinforce the same against sidewise movement by ears 42 which project from the side edges thereof and are turned so as to overlap the side surface of the keeper 2. These will coöperate with the locking pin 5 to prevent lateral displacement of the latch bar by blows which it is likely to receive. They also furnish a larger surface at each side which is easy to engage by the fingers, to thereby lift the latch bar. The pivot pin 3 upon which the keeper is mounted, is provided with a nut 30, by means of which the keeper may be removed if this is desired.

It will be seen upon inspection of Figs. 1, 2, and 3, that the tapering shape of the keeper, together with the side projection of the eye 11, serves as a protection to the keeper from being engaged and moved from its locking position when dragging the hook over any object. The above construction of hook provides for easy release of the keeper for the removal or insertion of a rope or eye in the hook and at the same time securely holds the same when it is in place and prevents the possibility of accidental removal.

The hook is particularly designed for use where the line in which it is connected is subject to movement lengthwise over objects, and especially in logging operations. The keeper 2 produces a smooth inclined surface to objects over which it is drawn and prevents engagement of the point of the hook therewith. The lateral projection of the eye 11 being in the same direction and extending beyond and so as to cover the end of the keeper and its locking catch, prevents engagement thereof by passing objects in such manner as might turn the keeper. The type of locking catch securely holds the keeper in normal position and yet is easily engaged to open the hook when desired. Its side ears 42 prevent side displacement from knocks received while in use.

What I claim as my invention is:

1. A bull hook having a wedge shaped keeper centrally pivoted upon the shank with its large end extending outward from the shank to cover the point of the hook, the hook having its eye projecting beyond and to protect the small end of the keeper, a latch bar extending along the outer edge of the keeper and pivoted at the large end thereof, the opposite end of the latch bar carrying a locking pin which projects through the keeper and into the shank of the hook.

2. A bull hook having a wedge shaped keeper centrally pivoted upon the shank with its large end extending outward from the shank to cover the point of the hook, a latch bar extending along the outer edge of the keeper and pivoted at the large end thereof, the opposite end of the latch bar carrying a locking pin which projects through the keeper and into the shank of the hook, the end face of the large end of the keeper having a bore therein inside of the pivot point of the latch bar and the latch bar having an arm extending down over said bore, and a spring in said bore acting against said arm to hold the latch bar in locking position.

3. The combination with a bull hook of a wedge shaped keeper pivoted upon the shank of the bull hook to turn, and adapted when alined with the hook to close its opening, a latch bar pivoted upon the large end of the keeper and having a locking pin at its swinging end adapted to enter a hole in the shank of the hook, the latch bar also having ears, adjacent its swinging end and extending down over the side faces of the keeper.

Signed at Elma, Grays Harbor county, Washington, this 15th day of June, 1920.

NAPOLÉON E. GAGNON.